United States Patent [19]

Rauh et al.

[11] Patent Number: 4,781,899
[45] Date of Patent: Nov. 1, 1988

[54] PURIFICATION OF CRYSTALLIZED SOLIDS MADE VIA CONTINUOUS CRYSTALLIZATION

[75] Inventors: Francis Rauh, Plainsboro; Henry A. Pfeffer, III, Mercerville, both of N.J.

[73] Assignee: Intermountain Research & Development Corporation, Green River, Wyo.

[21] Appl. No.: 634,939

[22] Filed: Jul. 27, 1984

[51] Int. Cl.$^4$ .................. C22B 25/10; C01D 15/08; C01D 17/00

[52] U.S. Cl. .................. 423/206 T; 423/421; 23/302 T

[58] Field of Search .......... 423/206 T, 188, 189, 423/421, 422, 425, 427; 23/302 T

[56] References Cited

U.S. PATENT DOCUMENTS

| | | | |
|---|---|---|---|
| 2,798,790 | 7/1957 | Pike | 23/302 T |
| 3,131,996 | 5/1964 | Seglin et al. | 423/206 T |
| 3,260,567 | 7/1966 | Hellmers | 23/302 T |
| 3,273,959 | 9/1966 | Miller | 423/206 T |
| 3,425,795 | 2/1969 | Howard et al. | 423/206 T |
| 3,594,119 | 7/1971 | Pruiss et al. | 423/424 |
| 4,021,527 | 5/1977 | Baadssard | 423/206 T |
| 4,158,043 | 6/1979 | Gloster | 423/206 T |
| 4,160,812 | 7/1979 | Conroy et al. | 423/421 |
| 4,202,667 | 5/1980 | Conroy et al. | 423/206 T |
| 4,291,002 | 9/1981 | Arnold et al. | 423/427 |

OTHER PUBLICATIONS

Krebs Cyclowash, Krebs Engineers, Menlo Park, CA.

Primary Examiner—Gary P. Straub
Attorney, Agent, or Firm—Christopher Egolf

[57] ABSTRACT

Crystal solids made via the continuous crystallization of a crude, concentrated aqueous feed solution are recovered as a crystalline solid product that is relatively free of impurities present in the crystallizer liquor. A portion of the withdrawn crystallizer slurry is concentrated in a first hydroclone, diluted with crystallizer feed solution, concentrated in a second hydroclone, and centrifuged and dried to recover the crystalline solid product.

19 Claims, 1 Drawing Sheet

PRIOR ART

PURIFICATION OF CRYSTALLIZED SOLIDS MADE VIA CONTINUOUS CRYSTALLIZATION

BACKGROUND OF THE INVENTION

1. Field of the Invention

This invention relates to the purification of crystalline solids crystallized from a crude, concentrated aqueous feed solution. More particularly, an aqueous crystal slurry withdrawn from a continuous crystallizer is treated in a double hydroclone procedure to recover crystal solids that are relatively low in impurities.

2. Description of the Prior Art

Most soda ash in the United States is refined from trona ore, a crude form of sodium sesquicarbonate ($Na_2CO_3.NaHCO_3.2H_2O$). The soda ash ($Na_2CO_3$) is obtained by crystallization of a sodium carbonate species from crude concentrated aqueous feed solution derived from solubilization of the ore.

In one soda ash process, an aqueous slurry of sodium carbonate monohydrate is recovered from a crude, concentrated aqueous sodium carbonate solution by evaporative removal of water in a continuous crystallization operation. Impurities (like sodium chloride and sodium sulfate) present in the crude sodium carbonate feed solution become concentrated in the liquor of the crystallizer slurry and contaminate the recovered crystallizer slurry and contaminate the recovered crystalline sodium carbonate.

The crystalline sodium carbonate recovered from the crystal slurry may be water-washed to remove impurities from associated crystallizer liquor, but such washing results in loss of alkali values from dissolution of the solid sodium carbonate into the wash liquor. Such wash liquors usually contain dilute concentrations of sodium carbonate that are not directly recoverable because of the presence of impurities. Recycle of these dilute liquors to the crystallizer is undesirable because such wash liquors reduce crystallizer efficiency owing to their diluent effect and the consequent need to remove additional water.

The process of this invention provides a simple but ingenious way of purifying a crystalline species, particularly sodium carbonate, recovered from an aqueous crystal slurry, without resorting to water washing procedures or the introduction of other aqueous streams that reduce the overall efficiency of the continuous crystallization operation.

SUMMARY OF THE INVENTION

The present invention is an improvement in the production of crystal solids by continuous crystallization from a crude, concentrated aqueous feed solution, and results in a reduction in the level of impurities in the recovered crystalline product, by (a) removing aqueous crystal slurry from a crystallizer circuit and separating the crystallized solids from the aqueous solution of the crystal slurry by the steps of
  (i) concentrating the removed slurry in a first hydroclone;
  (ii) diluting the concentrated slurry with aqueous solution used as crystallizer feed;
  (iii) concentrating the diluted slurry in a second hydroclone; and
  (iv) dewatering the concentrated slurry in a centrifuge to separate the crystal solids from the aqueous liquor; and (b) drying the centrifuged crystal solids.

Aqueous liquor from the two hydroclones, as well as the aqueous centrifuge liquor, is preferably recycled back into the crystallizer circuit.

The process of this invention is particularly adapted to the recovery of pure crystalline soda ash from a crude, concentrated aqueous sodium carbonate feed solution.

The slurry removed from the crystallizer circuit preferably contains from 20-50 wt %, and more preferably 30-40 wt %, solids.

After concentration of the slurry feed in the first hydroclone, the concentrated slurry is preferably diluted with crystallizer feed solution in a weight ratio of from 0.5:1 to 3:1 feed solution:slurry, and the diluted slurry preferably contains from 10-30 wt % solids.

The slurry feeds to both the first and second hydroclones are desirably concentrated to a concentration of at least 50 wt % solids.

DETAILED DESCRIPTION

Figure 1:
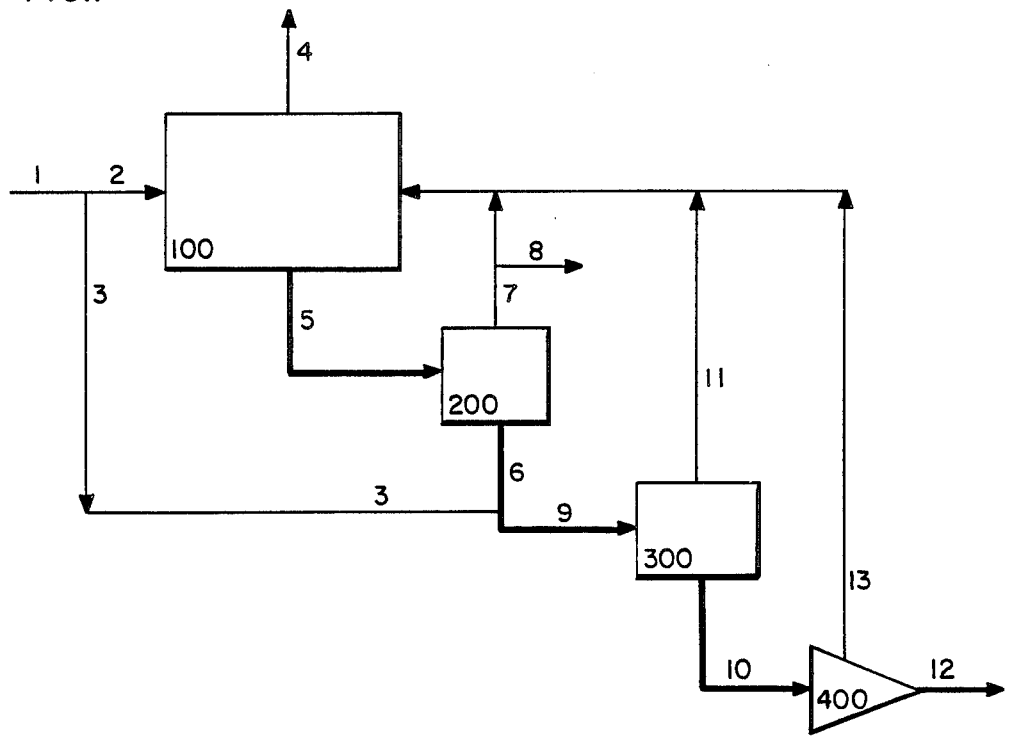
FIG. 1 is a schematic flow diagram, illustrating the recovery of pure soda ash from a crude sodium carbonate solution via evaporative crystallization of sodium carbonate monohydrate and further processing of the crystal slurry in one embodiment of the invention.

The process of this invention is generally applicable to the recovery of pure crystal solids that are continuously crystallized from a crude aqueous feed solution containing such solids in dissolved form.

The invention is particularly suited for use in the recovery of crystalline soda ash from crude sodium carbonate solutions, and the detailed description which follows is directed to this application. The procedures of the invention described below are nevertheless applicable to the recovery of other crystallized solids, e.g., sodium sulfate, which are recovered by continuous crystallization of an aqueous feed solution contaminated with other dissolved components.

With reference to the recovery of soda ash as the crystalline product, the crude $NaHCO_3$-containing aqueous crystallizer feed solution may be derived from a $NaHCO_3$-containing natural ore source such as trona ($Na_2CO_3.NaHCO_3.2H_2O$), wegscheiderite ($Na_2CO_3.3NaHCO_3$), nahcolite ($NaHCO_3$), or combinations of these ores. The crude, aqueous sodium carbonate solution may also be a natural brine, e.g., Searles Lake brine, or an impure $Na_2CO_3$-containing solution obtained from such brine or other sources.

The crude sodium carbonate solution obtained directly or indirectly from these ore or brine sources is desirably relatively concentrated with respect to sodium carbonate. Concentrations close to a saturation concentration with respect to the sodium carbonate species being crystallized are preferred, since the continuous crystallization operation may then be operated more efficiently. A concentration of 20 wt % $Na_2CO_3$, and preferably at least 25 wt % $Na_2CO_3$, is desirable for crude sodium carbonate feed solutions from which sodium carbonate monohydrate is recovered.

The crude sodium carbonate solution also contains impurities normally present in the ore or brine source, e.g. NaCl, Na$_2$SO$_4$, organics, and the like. These impurities may also be present because of the treatment of the ore source, e.g., calcination of dry-mined trona ore in the monohydrate process. It should be recognized that the levels of these impurities will affect the saturation concentration of sodium carbonate in such feed solution and will have an impact on the manner in which the continuous crystallizer circuit is operated.

The sodium carbonate crystal species that is formed during continuous crystallization is preferably sodium carbonate monohydrate. Anhydrous sodium carbonate, sodium carbonate decahydrate, or other sodium carbonate salts may also be the crystallized sodium carbonate species.

The crystallization of sodium carbonate from the concentrated sodium carbonate solution is carried out as a continuous operation in a crystallizer circuit.

The continuous crystallization of sodium carbonate may be effected in a multi-effect crystallizer. The crystallization may alternatively be carried out in a single stage crystallizer, for example by employing mechanical or thermal vapor recompression.

Evaporative or cooling crystallizers may be employed, the choice depending on the nature of the sodium carbonate species being crystallized.

Recovery of the preferred sodium carbonate monohydrate is normally carried out by evaporating water at a temperature of from 35° C. to about 109° C. The crystallization temperature is preferably maintained between 50°-109° C. If a single stage evaporator is used, the crystallization temperature is preferably within the range of 85°-109° C.

Anhydrous sodium carbonate, if desired as the crystalline sodium carbonate, is ordinarily recovered at temperatures in excess of about 109° C. This presence of appreciable amounts of impurities like NaCl allows the use of somewhat lower crystallization temperatures for the recovery of anhydrous sodium carbonate.

The concentration of the sodium carbonate solids in the withdrawn crystal slurry, produced via continuous crystallization in the crystallizer circuit, is preferably maintained at from 20-50% by weight solids, more preferably between 30-40% by weight solids.

The crystallized sodium carbonate is then separated from the aqueous solution (mother liquor) in the withdrawn crystal slurry, according to the process of this invention. This procedure results in a relatively pure crystal solid product, free of the contaminants (from the ore source or otherwise) that ordinarily become concentrated in the aqueous liquor of the crystallizer slurry.

The crystal recovery procedure of this invention has the advantage of avoiding the use of wash water, which has the tendency to dissolve desirable product solids and reduce the yield of the crystal product. The procedure also avoids the introduction of diluent wash water into the system, eliminating the need to evaporate such wash water and also conserving pure water supplies, which is particularly important when pure water is a scarce resource.

The crystal slurry withdrawn from the crystallizer circuit, typically containing 30-40 wt % solids, is concentrated further in this procedure by being introduced to a first hydroclone. The effluent streams from the first hydroclone are (i) a concentrated slurry stream, e.g., containing at least 50 wt % solids, and (ii) a solids-free liquor stream.

The liquor effluent stream from the hydroclone is simply aqueous liquor from the crystallizer and typically contains organic and inorganic impurities (e.g., NaCl, Na$_2$SO$_4$) in much higher concentrations than are found in the aqueous sodium carbonate solution fed to the crystallizer circuit. All or a part of this liquor stream from the first hydroclone may be recycled to the crystallizer circuit, for recovery of its residual alkali values.

In order to control the accumulation of organic and inorganic impurities in the crystal slurry below a level at which the sodium carbonate crystal solids are adversely affected, a portion of the aqueous solution should be purged from the crystal slurry in the crystallizer. This is conveniently accomplsshed by diverting a portion of the aqueous solution (mother liquor) which is obtained from the first hydroclone (and otherwise recycled to the crystallizer circuit) and simply discarding it as a purge. This purge effectively maintains the organic and inorganic impurities at an acceptable level and prevents them from becoming excessively concentrated in the crystallizer circuit, particularly in the case of evaporative crystallization.

In the next step of this invention, the concentrated slurry obtained from the first hydroclone is diluted using a portion of the same aqueous sodium carbonate solution that is ordinarily fed to the crystallizer circuit as crystallizer feed. The first hydroclone slurry effluent is typically diluted from a concentration of about 50% solids (the slurry solids concentration exiting from the first hydroclone) to about 25 wt % solids, through the addition of diverted crystallizer feed solution. The dilution ratio may, however, range from about 0.5:1 to 3:1 feed solution:slurry. The resultant diluted slurry preferably has a solids concentration within the range of 10-30 wt % solids.

The diluted slurry is then introduced to a second hydroclone, which concentrates the slurry and also produces a solids-free liquor stream. The hydroclone typically will double the solids content of the slurry feed stream, concentrating a 25 wt % solids feed slurry to about 50 wt % solids in the exit slurry. All or a portion of the aqueous liquor stream from the second hydroclone may be returned to the crystallizer; preferably all of the solution is recycled to recover its alkali values.

The net effect of the second hydroclone step is that the product slurry from the first hydroclone is "washed" with crystallizer feed solution and this "wash" feed solution is then introduced (via liquor effluent from the second hydroclone) into the crystallizer circuit. The dilution effected by this "washing" procedure results in a significant decrease on impurities, both organic and inorganic, that are present on the product crystals ultimately recovered, than if the crystallizer slurry had simply been passed through a single hydroclone and then centrifuged.

The concentrated slurry from the second hydroclone is introduced to a centrifuge, which dewaters the crystal solids to yield a damp cake, typically containing less than about 15 wt %, and more preferably, less than about 10 wt % residual liquor. Other solid-liquid separation devices analogous to a centrifuge can be used in place of a centrifuge.

The liquor from the centrifugation procedure is perferably recycled and introduced into the crystallizer circuit.

There is no need to wash the centrifuged crystal cake before it is dried, since the crystals contain a relatively low level of organic and inorganic contaminants associated with the residual liquor on the crystals. The separated crystals may, nevertheless, optionally be washed during or after the centrifugation step.

In an alternative embodiment of this invention, the hydroclone "washing" procedure described above may be simplified through the omission of the first hydroclone. The slurry removed from the crystallizer circuit is diluted directly with a portion of the crystallizer feed solution to yield a dilute slurry. The dilute slurry is then introduced to the hydroclone, where it is concentrated. The concentrated slurry is then dewatered in the centrifuge, as described previously.

This alternative procedure with only one hydroclone yields satisfactory results in terms of product impurity levels, but results in a larger amount of valuable alkali being lost when a portion of the recycled hydroclone liquor is purged to control impurity levels. This drawback may be minimized by withdrawing solids-free liquor from a quiescent or elutriating zone in the crystallizer and discarding such liquor as a purge, thus avoiding any need to discard a portion of the liquor stream from the hydroclone.

The centrifuged sodium carbonate crystals, regardless of which hydroclone procedure is used, are dried at elevated temperature. The drying step may be carried out in a fluid bed drier, rotary drier, or other conventional drying apparatus. Crystalline sodium carbonate monohydrate, for example, is desirably dried at temperatures from 100°–175° C.

The resulting soda ash is a pure, free-flowing product that is relatively low in impurities, despite the centrifuge cake not having been washed with water. For crystalline soda ash obtained from sodium carbonate monohydrate, the resulting dried product contains at least 95 wt % $Na_2CO_3$, typically 99 wt % $Na_2CO_3$ or more.

EXAMPLE

This Example illustrates the recovery of relatively pure soda ash from a concentrated, crude aqueous sodium carbonate solution via evaporative crystallization of sodium carbonate monohydrate and the subsequent treatment of the crystal slurry by the process of this invention. The drawing in FIG. 1 is a schematic flow diagram depicting the process of this Example.

In order to facilitate comparison with the Comparative Example described later on, the flow rates in this Example and in the Comparative Example have both been selected to yield 100 kg/hr soda ash (as solid $Na_2CO_3H_2O$).

Referring now to FIG. 1, the aqueous feed solution 1 contains 29 wt % $Na_2CO_3$ (a saturation concentration), 1 wt % NaCl, and 0.5 wt % $Na_2SO_4$ and is at a temperature of about 85° C. The incoming feed solution 1 is filtered mining solution that has been obtained from the solution mining of subterranean trona ore deposits with aqueous sodium hydroxide mining solvent.

The aqueous feed solution flow stream 1 (387 kg/hr) is divided into two flow streams, approximately equal in volume: crystallizer feed solution 2 (187 kg/hr) and diverted (to the first hydroclone) feed solution 3 (200 kg/hr).

The crystallizer feed solution 2 is introduced into an evaporative crystallizer circuit 100 that is operated on a cottinuous basis. Water 4 (185 kg/hr) is evaporated in the crystallizer circuit 100, at temperatures ranging from 50°–109° C. in the three effects of the crystallizer circuit, to yield a slurry of sodium carbonate monohydrate crystals.

A portion 5 (300 kg/hr) of the crystal slurry is withdrawn from the crystallizer circuit 100, for recovery of the product solids by the process of this invention. The slurry 5 contains 33 wt % solids; its liquor contains 26 wt % $Na_2CO_3$, 4 wt % NaCl and 2 wt % $Na_2SO_4$, the latter two impurities having been concentrated to four times their original concentration in the feed solution 1.

The withdrawn crystal slurry 5 (300 kg/hr) is introduced to a first hydroclone 200, which concentrates the solids in the slurry, yielding a concentrated slurry stream 6 (200 kg/hr) containing 50 wt % solids. The liquor stream 7 (100 kg/hr) from the first hydroclone 200 is substantially solids-free.

A major portion 8 (92 kg/hr) of the first hydroclone liquor is discarded as purge, to prevent the unwanted build-up of impurities (NaCl, $Na_2SO_4$) in the crystallizer mother liquor. The balance of the first hydroclone liquor, remaining after removal of the purge stream 8, is recycled to the crystallizer circuit 100 for recovery of its alkali values.

The purge stream 8 serves to maintain the level of impurities below concentrations at which such impurities would adversely affect the product crystal habit. Recycle of all of the hydroclone liquor to the crystallizer circuit would result in the uncontrolled build-up of impurities in the recycled liquor streams, not only affecting product crystal habit but also leading to co-crystallization of the undesirable $Na_2SO_4$-containing double salt, burkeite.

The concentrated slurry 6 (200 kg/hr) from the first hydroclone 200 is combined with diverted feed solution 3 (200 kg/hr), to dilute the slurry and impurities in its liquor, to yield a well-mixed dilute slurry stream 9 containing only 25 wt % solids.

The dilute slurry 9 (400 kg/hr) is then introduced to a second hydroclone 300, which concentrates the solids in the slurry, yielding a concentrated slurry stream 10 (200 kg/hr) containing 50 wt % solids. In contrast to the first hydroclone slurry 6, whose liquor contained 4 wt % NaCl and 2 wt % $Na_2SO_4$, the liquor in the second hydroclone slurry 10 contains only 1 wt % NaCl and 0.5 wt % $Na_2SO_4$.

The liquor stream 11 (200 kg/hr) from the second hydroclone 300 is substantially solids-free and is recycled to the crystallizer circuit 100 for recovery of its alkali values.

The concentrated slurry 10 (200 kg/hr) from the second hydroclone 300 is introduced to a centrifuge 400, to dewater the slurry and yield a damp cake 12 (110 kg/yr) containing crystalline sodium carbonate monohydrate (100 kg/hr) and about 10 wt % mother liquor. The damp cake 12 is not washed during the centrifugation. The centrifuge liquor 13 (90 kg/hr) is recycled to the crystallizer circuit 100.

The damp solids 12 from centrifugation contain a relatively low level of inorganic impurities, despite not having been water-washed: 0.18 wt % NaCl and 0.09 wt % $Na_2SO_4$. Organic impurities in the damp solids are likewise at a relatively low concentration. After drying (not shown in the drawing) to remove the hydrated and free water in the damp solids, the soda ash product contains 99.7 wt % $Na_2CO_3$, 0.22 wt % NaCl and 0.11 wt % $Na_2SO_4$.

COMPARATIVE EXAMPLE

In this Comparative Example, soda ash is recovered from a concentrated aqueous sodium carbonate solution via evaporative crystallization of sodium carbonate monohydrate, using procedures similar to that of the Inventive Example. The drawing in FIG. 2 is a schematic flow diagram of this conventional procedure for carrying out the soda ash crystallization and recovery, using only one hydroclone and a centrifuge.

Figure 2:
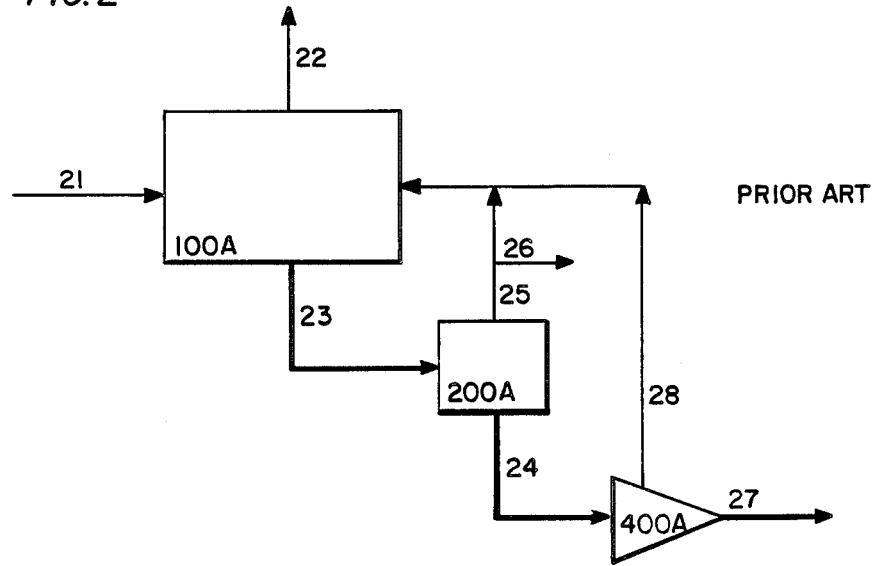
FIG. 2 is a schematic flow diagram of a prior art process in which soda ash is recovered from a crude sodium carbonate solution via evaporative crystallization of sodium carbonate monohydrate and further conventional processing of the crystal slurry.

Referring now to FIG. 2, aqueous feed solution 21, having a composition and temperature identical to that of the Illustrative Example, is introduced to the identical crystallizer circuit 100A. The flow rate of the feed solution 21 (380 kg/hr) is slightly lower than that of the first Example, since flow rates in both Examples have been adjusted to yield 100 kg/hr soda ash solids in the damp centrifuge cake.

During evaporative crystallization, water 22 (185 kg/hr) is removed under the same temperature conditions as before, to yield a slurry of sodium carbonate monohydrate crystals. Crystal slurry 23 (300 kg/hr) that is removed from the crystallizer circuit 100A contains 33 wt % solids, as before; its liquor contains 26 wt % $Na_2CO_3$, 4 wt % NaCl, and 2 wt % $Na_2SO_4$, also as before.

The withdrawn crystal slurry 23 (300 kg/hr) is concentrated in a single hydroclone 200A, which yields a concentrated slurry 24 having 50 wt % solids.

The liquor stream 25 (100 kg/hr) from the hydroclone 200A is substantially solids-free. A portion 26 (85 kg/hr) of the hydroclone liquor 25 is discarded as purge, to prevent impurities from accumulating in the crystallizer mother liquor.

The concentrated hydroclone slurry 24 (200 kg/hr) is introduced to a centrifuge 400A, which dewaters the concentrated slurry to yield a damp cake 27 containing crystalline sodium carbonate monohydrate (100 kg/hr) and about 10 wt % mother liquor. As before, the damp centrifuge cake 27 is not washed. The centrifuge liquor stream 28 (90 kg/hr) is recycled to the crystallizer circuit 100A.

The damp solids 27 from centrifugation contain a substantial level of impurities: 0.36 wt % NaCl and 0.18 wt % $Na_2SO_4$. After drying (not shown in the drawing), the recovered soda ash product contains an unacceptably high level of impurities: 0.45 wt % NaCl, 0.22 wt % $Na_2SO_4$, and 99.3 wt % $Na_2CO_3$.

It is also important to note that the purge streams in the two Examples were very similar, both accounting for a loss of alkali ($Na_2CO_3$) that was only about 20–21% of the alkali in the respective aqueous feed solution streams. In order for the one stage hydroclone method of the Comparative Example to achieve desirable low impurities levels in the soda ash product (comparable to that of the Illustrative Example), the purge stream flow rate of the Comparative Example would have to be increased substantially. This would lead to the unacceptable loss of about 45% of the alkali in the incoming aqueous feed stream.

We claim:

1. In the production of crystal solids via their continuous crystallization from a crude, concentrated aqueous feed solution, containing dissolved impurities the improvement for reducing the level of impurities in the recovered crystalline solid product which comprises
   (a) removing aqueous crystal slurry from a crystallizer circuit and separating the crystallized solids from the aqueous solution of the crystal slurry by the steps of
      (i) concentrating the removed slurry in a first hydroclone;
      (ii) diluting the concentrated slurry with aqueous solution used as crystallizer feed;
      (iii) concentrating the diluted slurry in a second hydroclone; and
      (iv) dewatering the concentrated slurry in a centrifuge to separate the crystal solids from the aqueous liquor; and
   (b) drying the centrifuged crystal solids.

2. In the production of soda ash via the continuous crystallization of sodium carbonate from a crude, concentrated sodium carbonate feed solution, containing dissolved impurities the improvement for reducing the level of impurities in the recovered soda ash product which comprises
   (a) removing crystal slurry from a crystallizer circuit and separating the crystallized sodium carbonate from the aqueous solution of the crystal slurry by the steps of
      (i) concentrating the removed slurry in a first hydroclone;
      (ii) diluting the concentrated slurry with aqueous sodium carbonate solution used as crystallizer feed;
      (iii) concentrating the diluted slurry in a second hydroclone; and
      (iv) dewatering the concentrated slurry in a centrifuge to separate the crystal solids from the aqueous liquor; and
   (b) drying the centrifuged sodium carbonate crystal solids.

3. The process of claim 1 or 2 which further comprises purging a portion of solids-free crystallizer liquor from the crystallizer to control the accumulation of impurities below a level at which the crystallized solids are adversely affected.

4. The process of claim 3 wherein a portion of the liquor stream from the first hydroclone is purged and discarded, to control the accumulation of impurities below a level at which the crystallized solids are adversely affected.

5. The process of claims 1 or 2 which further comprises recycling at least a portion of the aqueous liquor stream obtained from the first hydroclone back into the crystallizer circuit.

6. The process of claim 1 or 2 which further comprises recycling at least a portion of the aqueous liquor stream from the second hydroclone back into the crystallizer circuit.

7. The process of claim 1 or 2 which further comprises recycling at least a portion of the aqueous liquor recovered from the centrifugation step back into the crystallizer circuit.

8. The process of claim 1 or 2 wherein the slurry removed from the crystallizer circuit contains from 20–50 wt % solids.

9. The process of claim 1 or 2 wherein the slurry removed from the crystallizer circuit contains from 30–40 wt % solids.

10. The process of claim 1 or 2 wherein the first hydroclone concentrates the slurry feed thereto to a concentration of at least 50 wt % solids.

11. The process of claim 1 or 2 wherein the concentrated slurry from the first hydroclone is diluted with crystallizer feed solution in a weight ratio of from 0.5:1 to 3:1 feed solution:slurry.

12. The process of claim 1 or 2 wherein the concentrated slurry from the first hydroclone is diluted with sufficient crystallizer feed solution to yield a diluted slurry containing 10–30 wt % solids.

13. The process of claim 1 or 2 wherein the second hydroclone concentrates the solids content of the diluted slurry feed thereto by a factor of at least 2.

14. The process of claim 1 or 2 wherein the second hydroclone concentrates the diluted slurry feed thereto to a concentration of at least 50 wt % solids.

15. The process of claim 1 or 2 wherein the centrifuge dewaters the concentrated slurry to yield a crystal solids cake containing less than 15 wt % liquor.

16. The process of claim 1 or 2 wherein the centrifuge dewaters the concentrated slurry to yield a crystal solids cake containing less than 10 wt % liquor.

17. The process of claim 2 wherein sodium carbonate monohydrate is the crystallized sodium carbonate.

18. The process of claim 2 wherein anhydrous sodium carbonate is the crystallized sodium carbonate.

19. The process of claim 2 wherein the crude sodium carbonate feed solution being subjected to crystallization is derived from trona, nahcolite, wegscheiderite, or mixtures of these ores.

* * * * *